US008453675B2

(12) United States Patent
Burrus et al.

(10) Patent No.: US 8,453,675 B2
(45) Date of Patent: Jun. 4, 2013

(54) ROTARY UNION WITH SELECTIVELY CONTROLLED SEAL

(75) Inventors: David Burrus, Chicago, IL (US); Graig Aaron LaCroix, Antioch, IL (US)

(73) Assignee: Deublin Company, Waukegan, IL (US)

( * ) Notice: Subject to any disclaimer, the term of this patent is extended or adjusted under 35 U.S.C. 154(b) by 381 days.

(21) Appl. No.: 12/628,642

(22) Filed: Dec. 1, 2009

(65) Prior Publication Data

US 2011/0126909 A1 Jun. 2, 2011

(51) Int. Cl.
*F16L 33/16* (2006.01)

(52) U.S. Cl.
USPC .............. 137/580; 285/103; 141/181

(58) Field of Classification Search
USPC .............. 137/580; 141/181; 285/101, 103, 285/100, 102, 95
See application file for complete search history.

(56) References Cited

U.S. PATENT DOCUMENTS

| | | | |
|---|---|---|---|
| 4,976,282 A | 12/1990 | Kubala | |
| 5,022,686 A | 6/1991 | Heel et al. | |
| 5,052,436 A * | 10/1991 | Bauch et al. | 137/580 |
| 5,098,135 A | 3/1992 | Timm | |
| 5,538,292 A | 7/1996 | Sommer | |
| 5,669,636 A | 9/1997 | Kubala | |
| 5,941,532 A | 8/1999 | Flaherty et al. | |
| 5,967,716 A | 10/1999 | Katsuzawa et al. | |
| 6,135,138 A * | 10/2000 | Richards, Jr. | 137/312 |
| 6,149,160 A | 11/2000 | Stephens et al. | |
| 6,308,734 B1 | 10/2001 | Smith et al. | |
| 6,325,380 B1 | 12/2001 | Feigl et al. | |
| 6,401,746 B1 | 6/2002 | Scott, Jr. | |
| 6,406,065 B1 | 6/2002 | Ott et al. | |
| 6,692,202 B2 | 2/2004 | Katsuzawa et al. | |
| 6,726,213 B2 | 4/2004 | Wang | |
| 6,929,099 B2 | 8/2005 | Jakob et al. | |
| 7,150,291 B2 * | 12/2006 | Ferrari et al. | 137/580 |
| 7,229,102 B2 | 6/2007 | Kubala | |

FOREIGN PATENT DOCUMENTS

| | | |
|---|---|---|
| JP | 08243877 A | 9/1996 |
| JP | 09100976 A | 4/1997 |
| JP | 11336969 A | 12/1999 |
| JP | 2005249007 A | 9/2005 |
| JP | 2007218293 A | 8/2007 |
| JP | 2008064274 A | 3/2008 |
| WO | WO 01/57426 A1 | 8/2001 |
| WO | 2007/071047 A1 | 6/2007 |

* cited by examiner

*Primary Examiner* — Craig Schneider
*Assistant Examiner* — Ian Paquette
(74) *Attorney, Agent, or Firm* — Leydig, Voit & Meyer, Ltd.

(57) ABSTRACT

A rotary union includes a non-rotating machine component having a receiving counterbore, a media channel opening, and a control channel. A housing is positioned within the receiving counterbore and has a bore and a control chamber in fluid communication with the control channel. A non-rotating seal member is slidably and sealingly disposed within the bore in the housing and has a media channel in fluid communication with the media channel opening and the receiving counterbore. The non-rotating seal member can be selectively extended or retracted within the bore of the housing, such that selective engagement of a face seal is accomplished under different operating conditions of the rotary union.

19 Claims, 6 Drawing Sheets

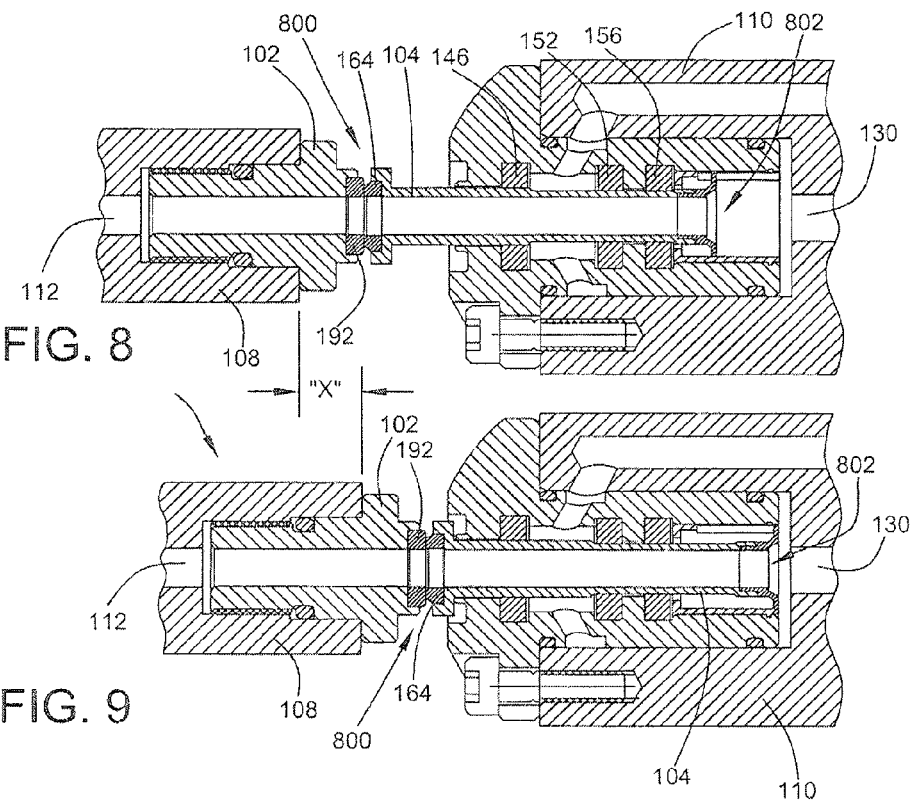
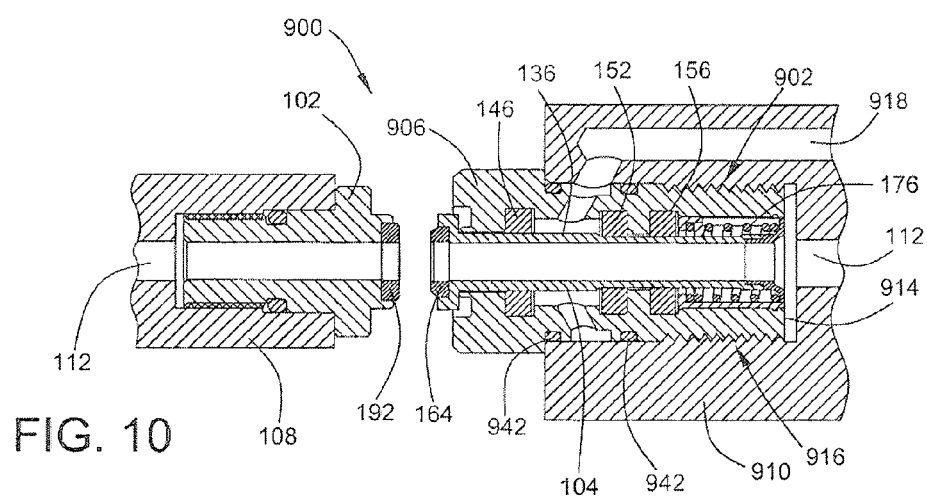

ROTARY UNION WITH SELECTIVELY CONTROLLED SEAL

TECHNICAL FIELD OF THE DISCLOSURE

The present invention relates to fluid coupling devices such as rotary unions and, more particularly, to an improved seal control mechanism that operates with lubricating and non-lubricating media, as well as without media.

BACKGROUND OF THE INVENTION

Fluid coupling devices such as rotary unions are used in industrial applications, for example, machining of metals or plastics, work holding, printing, plastic film manufacture, papermaking, semiconductor wafer manufacture, and other industrial processes that require a fluid medium to be transferred from a stationary source such as a pump or reservoir into a rotating element such as a machine tool spindle, work-piece clamping system, or rotating drums or cylinder. Often these applications require relatively high media pressures, flow rates, or high machine tool rotational speeds.

Rotary unions used in such applications convey fluid medium used by the equipment for cooling, heating, or for actuating one or more rotating elements. Typical fluid media include water-based liquids, hydraulic or cooling oils, air, and others. In certain instances, for example, when evacuating media from a fluid passage, rotary unions may operate under vacuum. Machines using rotary unions typically include precision components, such as bearings, gears, electrical components, and others, that are expensive and/or difficult to repair or replace during service. These components are often subject to corrosive environments or to damage if exposed to fluid leaking or venting from the rotary union during operation.

A rotary union typically includes a stationary member, sometimes referred to as the housing, which has an inlet port for receiving fluid medium. A non-rotating seal member is mounted within the housing. A rotating member, which is sometimes referred to as a rotor, includes a rotating seal member and an outlet port for delivering fluid to a rotating component. A seal surface of the non-rotating seal member is biased into fluid-tight engagement with the seal surface of the rotating seal member, generally by a spring, media pressure, or other method, thus enabling a seal to be formed between the rotating and non-rotating components of the union. The seal permits transfer of fluid medium through the union without significant leakage between the non-rotating and rotating portions. Fluid medium passing through the rotary union may lubricate the engaged seal surfaces to minimize wear of the seal members. When a rotary union is used with non-lubricating media (such as dry air) or without any media, the engaged seal surfaces experience a "dry running" condition, which causes rapid seal wear due to lack of adequate lubrication. Extended periods of dry running can cause severe damage to the seal members, thereby requiring expensive and time-consuming replacement of one or both seal members.

High-speed machining equipment, such as computer-numerical-control (CNC) milling machines, drilling machines, turning machines, transfer lines, and so forth, use rotary unions to supply a medium directly to the cutting edge of a tool for cooling and lubrication in an arrangement that is commonly referred to as "through spindle coolant." A through spindle coolant arrangement extends the service life of costly cutting tools, increases productivity by allowing higher cutting speeds, and flushes material chips that can damage the work-piece or cutting tool away from the cutting surfaces of the tool. Different work-piece materials typically require different media for optimal productivity and performance. For example, air or aerosol media may provide better thermal control when machining very hard materials, while liquid coolants may offer better performance when machining softer materials, such as aluminum. In addition, certain kinds of work may be performed more effectively and less expensively without a through-spindle medium.

A variety of designs intended to avoid dry running with non-lubricating media or no media are known. For example, rotary unions having seal surfaces that disengage when opposing fluid pressures are present, such as the arrangement disclosed in U.S. Pat. No. 5,538,292, can be complex and expensive to manufacture. Rotary unions having seal surfaces that disengage automatically in the absence of media, such as the arrangement disclosed in U.S. Pat. No. 4,976,282, are less complex to manufacture and incorporate in a machine, but are prone to engagement of the seal surfaces when non-lubricating media is used. Seal surfaces with special geometries for non-contacting operation with gases, such as those disclosed in U.S. Pat. Nos. 6,325,380 and 6,726,913, do not provide effective sealing with liquid media. Similarly, seal surfaces with special geometries to distribute the medium evenly, such as the seal arrangement disclosed in U.S. Pat. No. 6,149,160, offer no advantage when non-lubricating media is used. Rotary unions that engage the seal surfaces at all times, even with a reduced bias, such as the unions disclosed in U.S. Pat. No. 6,929,099, are prone to damage from dry running at high rotating speeds.

A further example of a known rotary union is disclosed in U.S. Pat. No. 5,669,636. This union includes two media inlet ports that are associated with piping and valves to provide media. The media provided causes the seal surfaces to engage in sealing relationship when a lubricating medium is used, and to disengage when a non-lubricating medium is present or when no medium is present. This arrangement can prevent dry running, but also causes spillage of medium remaining in the union when the seal surfaces disengage. Such spillage, especially in multi-axis machines, cannot always be directed away from surrounding components and can damage sensitive components of the machine.

SUMMARY OF THE DISCLOSURE

In one aspect, the disclosure describes a rotary union that includes a housing having a bore in fluid communication with a media channel opening and a control chamber disposed around the bore and fluidly isolated from the media channel opening. A non-rotating seal member is slidably disposed within the bore in the housing and has a media channel in fluid communication with the bore. A first sliding seal is disposed around the non-rotating seal member to seal the control chamber from the atmosphere. Two additional sliding seals are disposed around the non-rotating seal member adjacent one another as a pair to seal the control chamber from the media channel. During operation, the non-rotating seal member is arranged to extend from the housing when a fluid under pressure is present in the control chamber regardless of the pressurization state of the media channel.

In another aspect, the disclosure describes a system for selectively fluidly interconnecting a media channel defined through portions of rotating and non-rotating machine components. The system includes a receiving counterbore defined in the non-rotating machine component, a media channel opening in fluid communication with the receiving counterbore, and a control channel. A housing disposed within the receiving counterbore has a bore in fluid communication with the receiving counterbore and a control chamber in fluid communication with the control channel. A non-rotating seal member is slidably and sealingly disposed within the bore of the housing and has a media channel in fluid communication with the receiving counterbore. A first fluid valve arrangement operates to selectively fluidly connect the control chamber with a source of pressurized incompressible media, a vacuum sink, and/or a vent, such that the non-rotating seal member can extend relative to the housing when a fluid under pressure is present in the control chamber.

In yet another aspect, the disclosure describes a method for operating a rotary union. The rotating union is adapted to provide a mechanical face seal along a media channel extending between a rotating machine component and a non-rotating machine component. The method includes selectively engaging the mechanical face seal by applying a fluid pressure to a control chamber that is fluidly isolated from the media channel and that is defined between a non-rotating seal member and the non-rotating machine component.

In general, various embodiments of rotary unions that can maintain engagement between the seal surfaces to prevent undesired media leakage while allowing the seal surfaces to disengage in conditions that can lead to dry running and reduced seal life without significant additional expense to control seal engagement are disclosed. These rotary unions can maintain engagement between the seal surfaces while an internal vacuum is applied to remove media from the fluid channel, and allow seal contact to be maintained even when the distance between the rotating and non-rotating members varies during operation, as with a machining center drawbar during tool change.

Further, the disclosed rotary unions allow seal engagement to be controlled manually or selectively by the machine designer or the machine's control program using commonly available piping components, as well as automatically according to the nature of the medium being transferred. Such capability increases the functional flexibility of machines by allowing high-speed rotation of 40,000 rpm, or more, with lubricating media (such as water-based coolants or oil-based aerosols such as "minimum quantity lubrication"), non-lubricating media (such as dry air and inert gases), and without any media present.

BRIEF DESCRIPTION OF THE SEVERAL VIEWS OF THE DRAWINGS

FIGS. 8 and 9 are cross sections of an alternate embodiment of a rotary union during relative axial movement of the rotating and stationary components of the rotary union in accordance with the disclosure.

FIG. 10 is a cross section of yet another alternate embodiment of a rotary union in accordance with the disclosure.

DETAILED DESCRIPTION

Figure 1A:
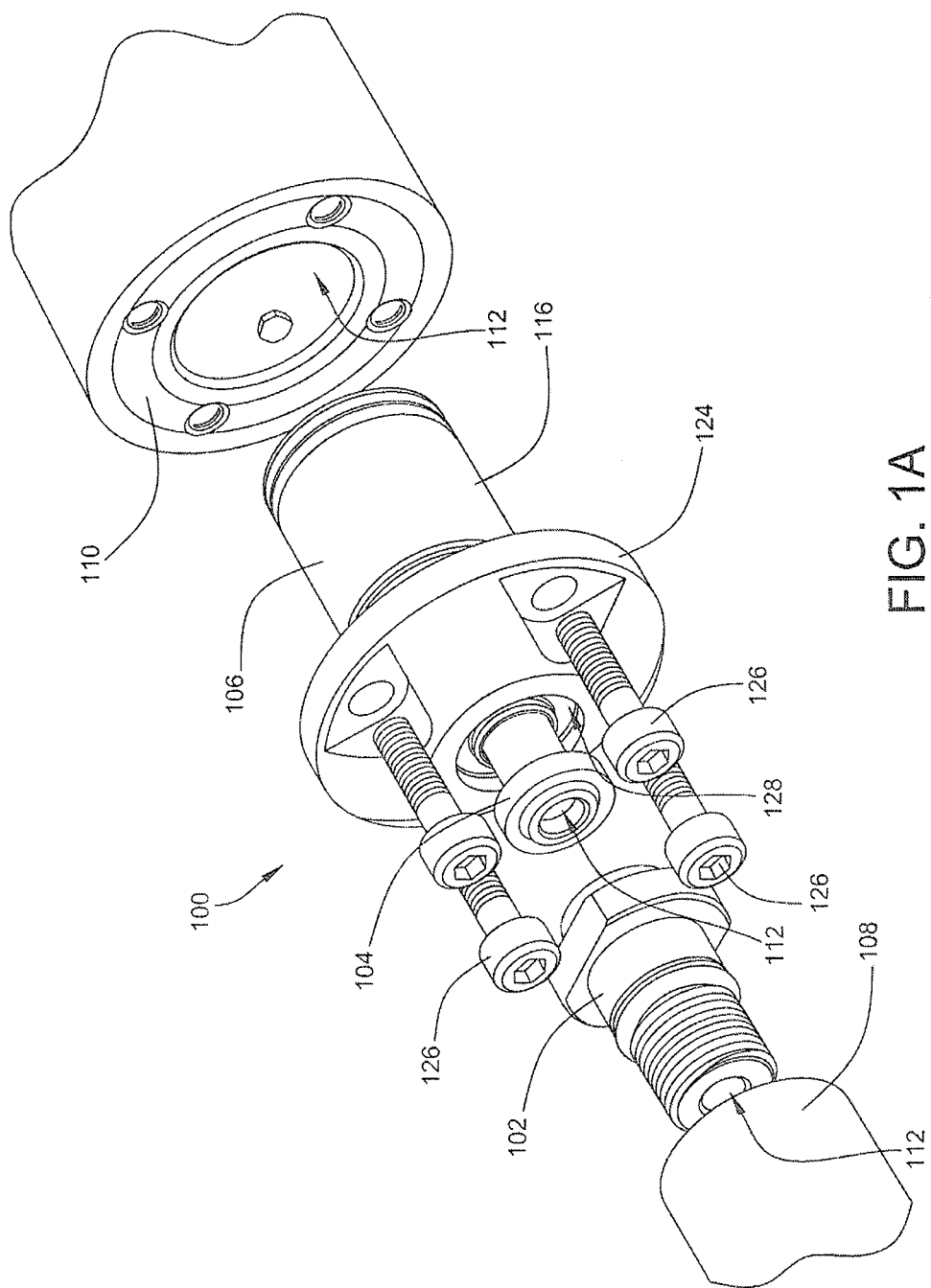
FIG. 1A is an exploded view of a rotary union in accordance with the disclosure.

In the drawings, which form a part of this specification, FIG. 1A is an exploded isometric view of one embodiment of a rotary union 100. The rotary union 100 includes a rotating seal member 102 and a non-rotating seal member 104 that is axially moveable relative to a housing 106. The rotating seal member 102 is associated with a rotating machine component 108, and the housing 106 is associated with a non-rotating machine component 110. A segmented conduit or media channel 112 extends through the non-rotating machine component 110, the rotating and non-rotating seal members 102 and 104 respectively, and the rotating machine component 108 as is best illustrated in FIG. 1B, which is a cross section through the rotary union 100.

Figure 1B:
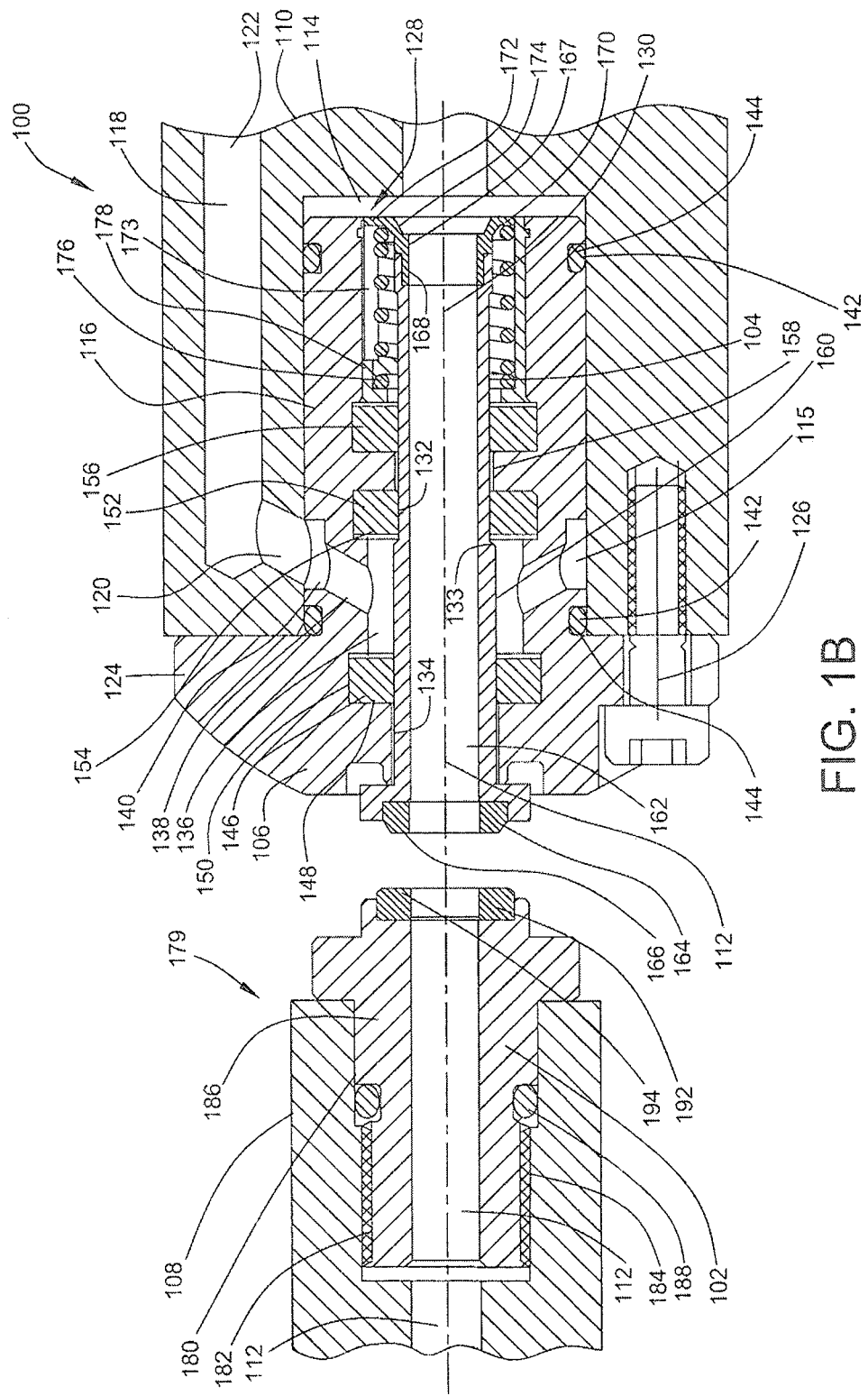
FIG. 1B is a cross section of the rotary union shown in FIG. 1A.

As shown in FIG. 1B, portions of the media channel 112 are defined in different components of the rotary union 100 to provide a fluid passageway through the rotating and non-rotating machine components 108 and 110 when the rotating and non-rotating seal members 102 and 104 are engaged. The media channel 112 may be selectively arranged to sealingly enclose fluids when the rotating and non-rotating seal members 102 and 104 are engaged to one another, and be open for venting to the atmosphere when the rotating and non-rotating seal members 102 and 104 are not engaged, as is described in more detail relative to the operation of the rotary union 100 and the description corresponding to FIGS. 3-6 below.

The rotating machine component 108 shown in FIGS. 1A and 1B, which can be any type of machine component such as a spindle on a CNC milling machine, supports the rotating seal member 102. A mechanical face seal created when the rotating seal member 102 is engaged with the non-rotating seal member 104 seals the media channel 112 for transferring a fluid medium from the non-rotating to the rotating machine components 110 to 108, as is known in the art. The rotating machine component 108 has a bore that defines a portion of the media channel 112 and further defines features for sealingly accepting the rotating seal member 102.

The non-rotating seal member 104 is slidably and sealingly disposed within a bore 128 of the housing 106. The structural arrangement permitting sliding of the non-rotating seal member 104 relative to the non-rotating machine component 110 enables the selective engagement and disengagement of the non-rotating seal member 104 with the rotating seal member 108, and compensates for axial displacement that may be present between the rotating and the non-rotating machine components 108 and 110.

The non-rotating machine component 110 has passages and openings for installation of the housing 106 and for provision of fluid thereto for the selective engagement of seals. Relative to the cross section of FIG. 1B, the non-rotating machine component 110 has a receiving counterbore 114, which matingly receives a cylindrical body portion 116 of the housing 106. A control channel 118 is formed in the non-rotating machine component 110 and fluidly communicates with the receiving counterbore 114 via a control opening 120 disposed in the component 110 between the control channel 118 and the receiving counterbore 114. The control channel 118 is further in fluid communication with a first media opening 122, which is selectively connectable to a source or sink of fluid during operation.

The selective variation of fluid pressure within the control channel 118 during operation yields hydraulic forces that are applied to the moveable non-rotating seal member 104 via a control chamber 136 formed between the seal member 104 and the housing 106, as shown in FIG. 1B. Extension of the seal member 104 relative to the housing 106 and engagement of corresponding seal rings disposed on the rotating and non-rotating seal members 102 and 104 create a fluid passage or media channel 112, which extends through the rotating and non-rotating machine components 108 and 110.

The housing 106 sealingly engages the non-rotating seal member 104, and defines various hydraulic chambers for the selective engagement between the rotating and non-rotating seal members 102 and 104. More specifically, the housing 106 includes a flange portion 124 adjacent the cylindrical body portion 116. In the illustrated embodiment, the flange portion 124 is connected to the non-rotating machine component 110 by four socket head cap screws 126 (FIG. 1A; only one shown in FIG. 1B), thus rigidly mounting the housing 106 on the component 110. It is contemplated that any other number of fasteners or any other fastening arrangement may be used.

The housing 106 further includes a central bore 128 extending through the housing 106 along a centerline 130. In the illustrated embodiment, the bore 128 is generally cylindrical and defines a minor inner-diameter 132 within the cylindrical body portion 116, and a major inner-diameter 134 within the flange portion 124. The major inner-diameter 134 is larger than the minor inner-diameter 132 such that a closing hydraulic surface 133 is defined radially between the minor and major inner diameters 132 and 134, as shown in FIG. 1B, overlapping the control chamber 136. In alternate embodiments, the minor and major inner-diameters 132 and 134 may both be defined within one portion of the housing 106.

The control chamber 136 extends peripherally around the bore 128 at an axial location overlapping the closing hydraulic surface 133 between the minor and major inner-diameters 132 and 134. A control chamber inlet 138 and a control chamber annulus 140 provide a fluid connection between the control chamber 136 and the control channel 118 when the housing 106 is connected to the non-rotating machine component 110. In the illustrated embodiment, the control chamber annulus 140 is formed into the receiving counterbore 114 and extends peripherally around the cylindrical body portion 116 so as to form a chamber 115 between the counterbore 114 and the body portion 116. The control chamber annulus 140 is fluidly connected to the control chamber 136 via a plurality of control chamber inlets 138, which are arranged symmetrically around the periphery of the counterbore 114 to provide a fluid connection to the control channel 118.

Various seals are disposed to fluidly isolate the control channel 118 and control chamber 136 from the receiving counterbore 114 and from the atmosphere when the non-rotating seal member 104 is disposed within the bore 128. In one embodiment, the receiving counterbore 114 is fluidly isolated from the control chamber annulus 140 by one of two static seals 142 disposed within circumferential grooves 144 formed adjacent each end of the cylindrical body portion 116. The second of the two static seals 142 isolates the control chamber annulus 140 from the atmosphere. Further, the control chamber 136 is fluidly isolated from the receiving counterbore 114 along the bore 128 by two seals 152 and 156, each of which is disposed around the bore 128 and axially positioned along the centerline 130.

The control chamber major sliding seal 146 is disposed in a circumferential groove 148 defined in the flange portion 124 of the housing 106, and sealingly engages in a static fashion an outer peripheral surface 150 of the circumferential groove 148. The major sliding seal 146 slidingly and sealingly engages an outer portion of the non-rotating seal member 104 to seal the control chamber 136 from the atmosphere. In a similar arrangement, a control chamber minor sliding seal 152 is disposed in a circumferential groove 154 in sealing engagement with the outer portion of the non-rotating seal member 104 and the housing 106 to seal the control chamber 136 from the receiving counterbore 114. An additional, media channel sliding seal 156 is sealingly and slidingly disposed between the receiving counterbore 114 and the non-rotating seal member 104 such that the control chamber minor sliding seal 152 is positioned between the control chamber 136 and the media channel sliding seal 156. The media channel sliding seal 156 provides additional and/or redundant sealing capability for fluidly isolating the control chamber 136 from the receiving counterbore 114 and, thus, the media channel 112. When differing pressures are present in the control chamber 136 and the media channel 112, the redundant sealing capability provided by the two seals 152 and 156 ensures that each seal will provide a sealing function by having a fluid pressure applied to only one of its axial faces.

In the figures, each of the control chamber major and minor sliding seals 146 and 152, as well as the media channel sliding seal 156, is represented by a shaded rectangular cross section. It is contemplated that any type of radial sealing member is suitable for providing a sliding sealing engagement function between the housing 106 and the non-rotating sealing member 104. Accordingly, the shaded rectangular cross sections illustrated in the several views of the drawings for each of the sliding seals 146, 152, and 156 generically represent any type of radial seal capable of providing a sealing function between the outer portion of a generally cylindrical or tubular shaped member and the inner portion of a bore. Examples of appropriate seals that are encompassed within the generic representation of the figures include O-ring seals, lip seals, U-shaped seals, seals having a rectangular cross section, seals having resilient members, or any other known type of radial seal.

The non-rotating seal member 104 has a generally cylindrical shape defining two portions, each having an outer diameter corresponding to the minor and major inner diameters 132 and 134 of the bore 128. More particularly, the non-rotating seal member 104 includes a minor diameter portion 158 disposed within the minor inner diameter 132 of the bore 128, and a major diameter portion 160 disposed within the major inner diameter 134 of the bore 128. A segment of the media channel 112 coincides with a cylindrical bore 162 formed in the non-rotating seal member 104, which extends through the entire length thereof and is fluidly open to the receiving counterbore 114.

The non-rotating seal member 104 includes a non-rotating seal ring 164 that is connected at an end of the non-rotating seal member 104 and which forms a non-rotating seal surface 166. In the illustrated embodiment, the non-rotating seal ring 164 has a trapezoidal cross section as a result of inner and outer chamfers extending along the inner and outer peripheries of the seal ring surrounding the seal surface. The chamfers are optional and one or both may be omitted depending on the desired balance ratio of the non-rotating seal member 104, as is known.

At an opposite end, the non-rotating seal member 104 includes structural features arranged to facilitate the flow of fluid medium through the media channel 112. More specifically, the non-rotating seal member 104 of the illustrated embodiment includes an inlet flange 167 having a pilot portion 168 disposed within an enlarged portion of the bore 162, and a flange portion 170 extending radially outward from the minor diameter portion 158. A conical chamfer 174 formed between the pilot portion 168 and the flange portion 170 facilitates the flow of media through the media channel 112.

To prevent rotation of the non-rotating seal member 104 relative to the housing 106, the flange portion 170 forms radially extending protrusions or keys 172 that engage openings or slots 173 formed in the housing 106. Sliding engagement between the keys 172 and slots 173 prevents rotation of the non-rotating seal member 104 relative to the non-rotating machine component 110 without impeding the axially sliding motion between the two components.

Axial motion of the non-rotating seal member 104 is biased toward an open position, which is in the direction toward the right side of FIG. 1B, by an opening spring 176. As shown, the flange portion 170 cooperates with a sleeve 178 to provide a spring retainer structure that retains the spring 176 and transfers an opening spring force between the housing 106, which is rigidly connected to the non-rotating machine component 110, and the non-rotating seal member 104, which, as previously described, is slidably disposed within the bore 128 of the housing 106.

In the illustrated embodiment, the rotating machine component 108 has a receptacle portion 179 with a pilot 180 and a threaded portion 182. Although pilot 180 and associated features may be used for proper alignment in certain high-speed applications, other features may be used or, alternatively, such alignment features may be omitted for applications operating at lower speeds. The rotating seal member 102 includes threads 184 that engage the threaded portion 182 to hold the two components together, but other attachment arrangements may be used. Eccentricity between the rotating and non-rotating seal members 102 and 104 is reduced by mating a pilot portion 186 defined on the rotating seal member 102 within the pilot 180 of the rotating machine component 108. A radial seal 188 is disposed in a circumferential groove 190 formed in the pilot portion 186 and sealingly engages the pilot 180 to provide fluid isolation of media within the media channel 112 from the atmosphere.

The rotating seal member 102 includes a rotating seal ring 192 defining a rotating seal surface 194 at an end thereof, which engages the non-rotating seal surface 166 to form a mechanical face seal when the rotary union 100 is in the closed or engaged position. In the illustrated embodiment, the rotating seal ring 192 is disposed to rotate at the same rate of rotation as the rotating machine component 108. The rotating seal ring 192 engages the non-rotating seal ring 164 via the rotating seal surface 194 when the non-rotating seal member 104 is selectively axially moved toward the rotating seal member 102 and achieves contact therewith.

Figure 2:
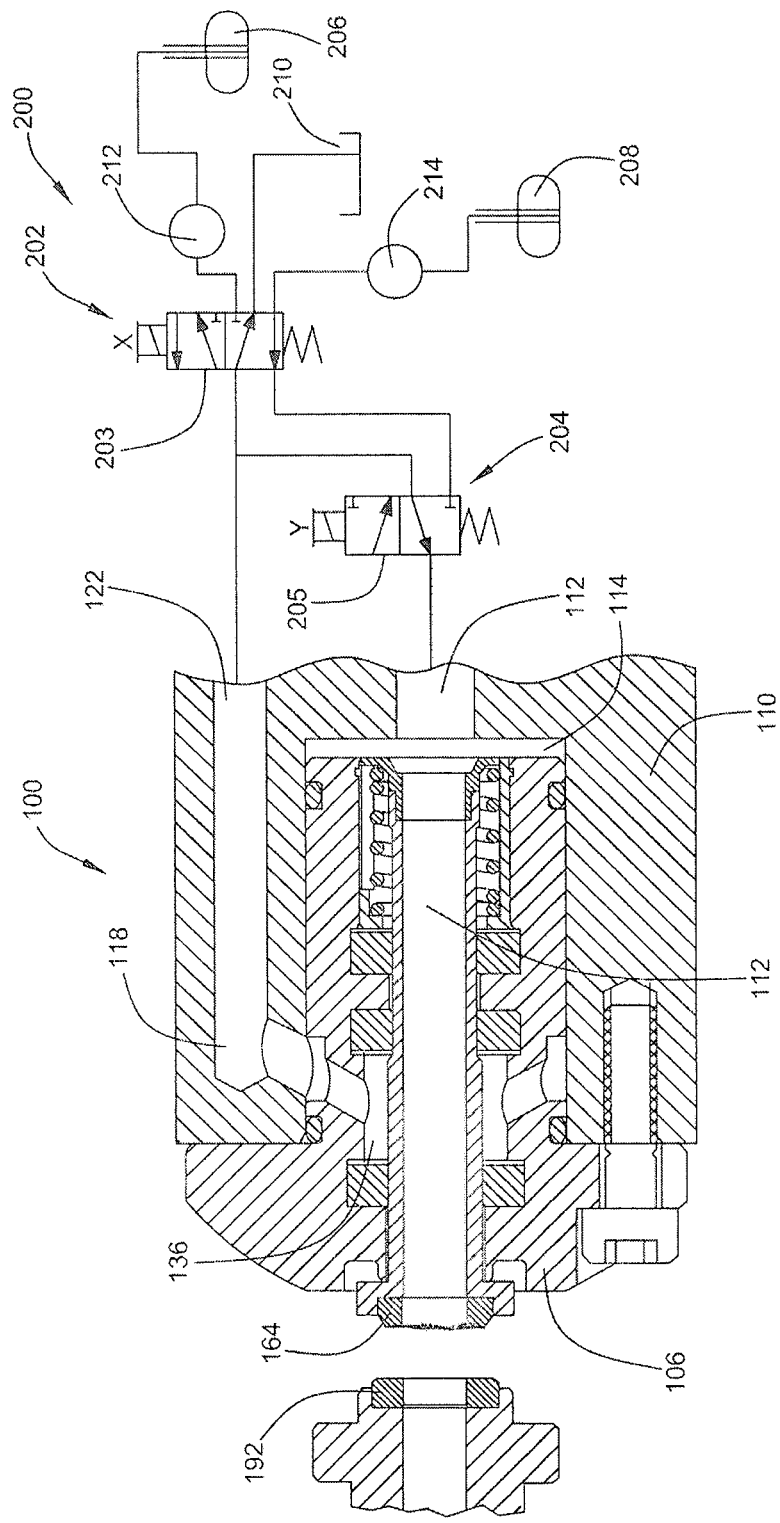
FIG. 2 is a cross section of the rotary union shown in FIG. 1A during an operating state when no medium is present.

FIG. 2 is a block diagram showing a seal control arrangement in accordance with the disclosure. In FIG. 2, as well as in the figures that follow, elements and/or structures that are the same or similar to those previously described are denoted by the same reference numerals as previously used for simplicity. Accordingly, a section of the rotary union 100 is shown having functional fluid connections with a media supply, return, and venting circuit 200. The circuit 200 is shown in block diagram form as an exemplary embodiment to illustrate the functions thereof relative to the rotary union 100. It should be understood that similar arrangements using components that are different from those illustrated are contemplated insofar as their function yields the same or similar effects in the operation of the rotary union 100.

In the exemplary embodiment shown in FIG. 2, the circuit 200 includes first and second valves 202 and 204. As shown, both first and second valves 202 and 204 are fluid valves having electronic actuators and spring bias devices that can selectively move valve elements, respectively, 203 and 205, into positions to fluidly interconnect various valve ports as described in further detail below. Moreover, the circuit 200 includes fluid reservoirs operating as sources or sinks of fluid media stored therein, and in-line pumps effecting the transfer of fluid to and from the reservoirs. Finally, a sump or in general, as shown, a vented reservoir provides an outlet to atmospheric pressure.

Figure 7:
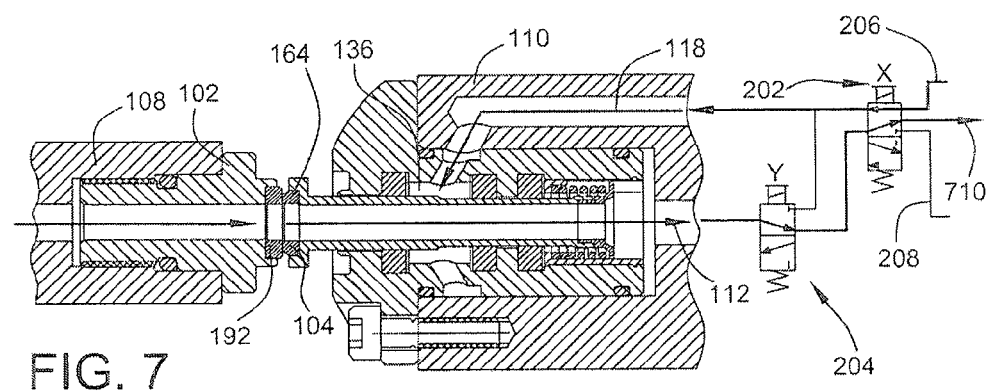
FIG. 7 is a cross section during operation under vacuum in accordance with the disclosure.

More specifically, the circuit 200 includes a first fluid valve 202, which in the illustrated embodiment is a two-position valve having five ports. The first fluid valve 202 is fluidly in communication with a first fluid reservoir 206, a second fluid reservoir 208, and a vented reservoir 210, as well as being fluidly connected to the second fluid valve 204 and to the first media opening 122 of the rotary union 100. The vented reservoir 210 may alternatively be a vacuum sink 710 as shown in the embodiment of FIG. 7. A first linear pump 212 is disposed in fluid relationship between the first fluid valve 202 and the first fluid reservoir 206, and a second linear pump 214 is disposed in fluid relationship between the first fluid valve 202 and the second fluid reservoir 208. Each of the first and second linear pumps 212 and 214 is capable of pumping fluid to flow into or out from its respective reservoir 208 and 208 at a selectively determinable supply or return pressure.

The second valve 204 is fluidly connected between the first fluid valve 202, the first media opening 122, and the media channel 112 of the rotary union 100. The fluid interconnections among components of the circuit 200, as well as the various valves, pumps, and reservoirs shown in the exemplary embodiment of FIG. 2, which may include additional components, may be integrated into a single module that is part of a machine, or may alternatively be distributed in more than one location either on a machine or in a facility that operates a machine, for example, such as a machining facility.

Engagement of the rotating and non-rotating seal surfaces 194 and 166 to create a face seal therebetween during operation of the rotary union 100 may be selectively controlled by appropriate activation of the first and second fluid valves 202 and 204. Depending on the mode of operation and the lubricity attributes of the medium provided through the media channel 112, and further depending on the presence or absence of medium within the channel 112, the rotating and non-rotating seal surfaces 194 and 166 can be engaged or disengaged. Five different operating states, which effect the engagement between the rotating and non-rotating seal surfaces 194 and 166, are shown in FIGS. 3-7. Each operating state involves the selective fluid connection of the control and media channels 118 and 112 of the rotary union 100 with the first, second, and/or vented reservoirs 206, 208, and/or 210, or the vacuum sink 710 (FIG. 7) by appropriately positioning the first and second valves 202 and 204. In FIGS. 3-7 that follow, solid line arrows are used to denote the general direction of flow of media in the couplings depending on the operating state illustrated.

Figure 3:
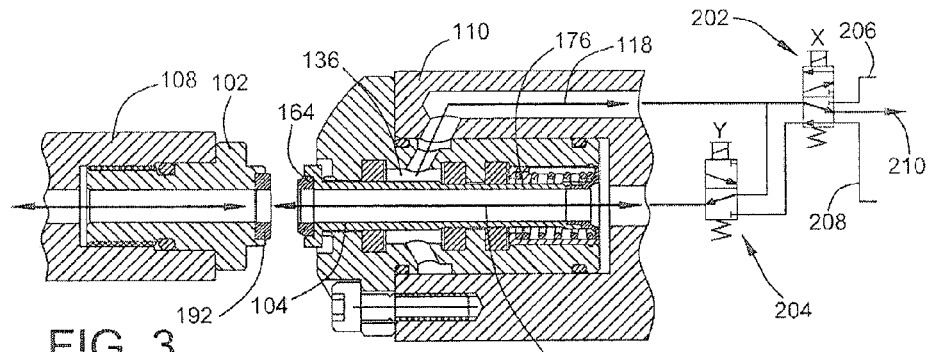
FIG. 3 is a cross section of the rotary union during operation when media pressure is released in order to disengage the seals, in accordance with the disclosure.

More specifically, an operating state when no medium is present in the media channel 112 is illustrated in FIG. 3. As is known, the absence of lubrication media may cause damage to the sealing interface between the rotating and non-rotating seal rings 192 and 164 if the sealing rings are engaged during operation of the rotary union. Accordingly, when operating in the absence of a medium, the non-rotating sealing member 104 is retracted into the non-rotating machine component 110, thus disengaging the non-rotating seal ring 164 from the rotating seal ring 192. In the illustrated embodiment, the media channel 112 is maintained at the same or a similar pressure as the control chamber 136 by appropriate positioning of the second fluid valve 204 at a first position, as shown in FIG. 3. The fluid pressure at the media channel 112 and at the control chamber 136 is made the same or about equal to atmospheric or ambient pressure by appropriately positioning the first fluid valve 202 in a first position to fluidly connect the media channel 112 and the control chamber 136 to the vented reservoir or sump 210. In the illustrated embodiment, the opening spring 176 operates to retract the non-rotating sealing member 104 into the non-rotating machine component 110. In this condition, media present within the media channel 112 is vented to atmosphere via the vented reservoir 210, the space between the disengaged rings 164 and 192, as well as, potentially, through a working port (not shown) disposed on the rotating machine component 108.

Figure 4:
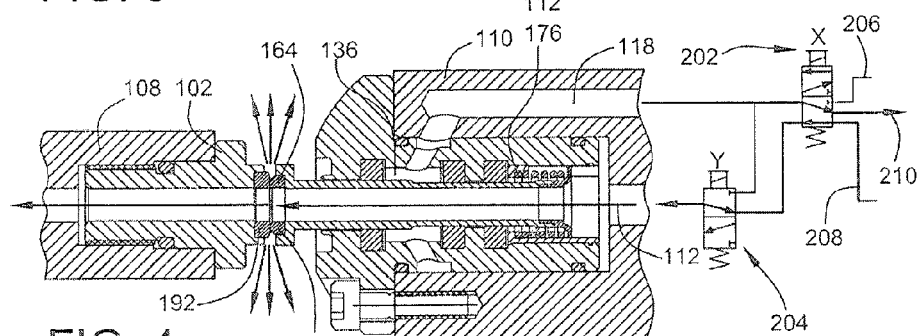
FIG. 4 is a cross section of a rotary union during operation with air or a similar non-lubricating medium in accordance with the disclosure.

A different operating state during which air or another compressible medium is transferred from the non-rotating machine component 110 to the rotating machine component 108 via the media channel 112 is shown in FIG. 4. As is known, air or certain other compressible media lack adequate lubrication characteristics for face seals used in rotary unions. As is known, compressible media that are aerosol solutions may possess lubricious characteristics, and are contemplated in this disclosure because operation of the rotary union under the conditions discussed herein would not be materially different than operation with dry air or another non-lubricious compressible medium.

When operating with compressible media, the rotary union 100 operates with a small gap present between the rotating and non-rotating seal rings 192 and 164. The small gap, which may be in the order of one or two thousandths of an inch (0.03-0.06 mm) or significantly less, for example, a few microns, ensures that damage from dry running may be avoided at the rotating and non-rotating seal rings 192 and 164, while reducing the leak rate of medium.

In the illustrated embodiment, the small gap at the rotating and non-rotating seal rings 192 and 164 is achieved by positioning the second fluid valve 204 to a second position that fluidly connects the media channel 112 with the second fluid reservoir 208, which in this case contains the compressible medium under pressure. The first fluid valve 202 is at the first position, as shown in FIG. 4, which is arranged to fluidly connect the control chamber 136 with the vented reservoir 210. As can be appreciated, an appropriate balance ratio of the rotary union 100 can be arranged to impart a closing force onto the non-rotating seal member 104 that acts against the opening force of the opening spring 176 to move to non-rotating seal member 104 toward the rotating seal member 102. In cases where the compressible medium contains lubricious components, for example, an aerosol solution, a thin film of lubricant may accumulate and be retained within the gap during operation, thus reducing the leak rate of leakage of medium.

Figure 5:
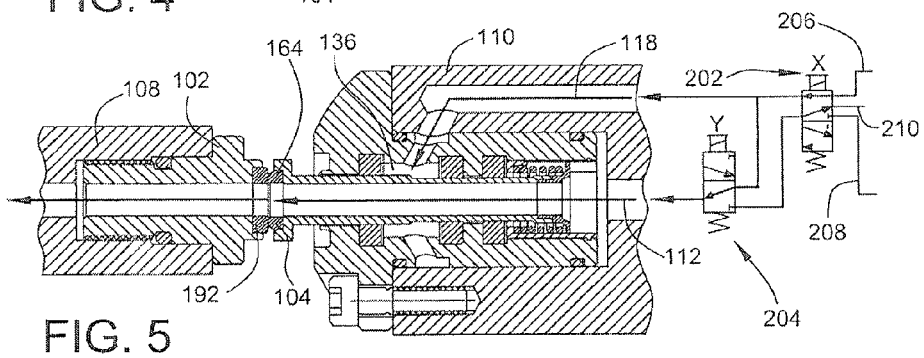
FIG. 5 is a cross section of a rotary union during operation with a lubricating medium in accordance with the disclosure.

Another operating state during which a water based coolant or another incompressible medium having lubricious properties passes through the media channel 112 is shown in FIG. 5. In this operating condition, a face seal is created by engagement of the rotating and non-rotating seal rings 192 and 164, which avoids leakage of the incompressible medium. When operating in this condition, pressurized incompressible medium from the first fluid reservoir 206 is supplied in parallel arrangement to the media channel 112 and the control chamber 136. As shown in FIG. 5, the first fluid valve 202 is placed to a second position to fluidly interconnect the first fluid reservoir 206 with the control channel 118, which is fluidly open to the control chamber 136. The second fluid valve 204 is placed at the first position to fluidly interconnect the control channel 118 with the media channel 112. Such positioning of the first and second fluid valves 202 and 204 ensures that the pressure of the incompressible medium is present at both the control chamber 136 and at the media channel 112.

As can be appreciated, the rotary union 100 can be arranged to have a second balance ratio when the control chamber is exposed to fluid pressure. In the operating state illustrated in FIG. 5, a resulting hydraulic force applied to the non-rotating seal member 104 pushes the rotating and non-rotating seal rings 192 and 164 into engagement with one another by overcoming the opening force of the spring 176. The second balance ratio may be appropriately selected such that so long as pressurized fluid is present at the control chamber 136, engagement between the rotating and non-rotating seal rings 192 and 164 can advantageously be maintained, regardless of the presence or absence of fluid pressure in the media channel 112 for most applications.

When the rotary union 100 is used in a material finishing machine, such as a CNC milling machine, the operating state shown in FIG. 5 can be present during machining operations. However, at times when fluid is evacuated from the media channel, or when the media channel is otherwise emptied of fluid, for instance, when the machine is changing tools, and especially if fluid spillage is to be avoided to protect surrounding machine components, then an additional operating capability of the union is desired. Such additional operating capability is shown in FIG. 6, where engagement between the rotating and non-rotating seal rings 192 and 164 is maintained to preserve the seal around the media channel 112 while media is evacuated from the media channel 112.

Figure 6:
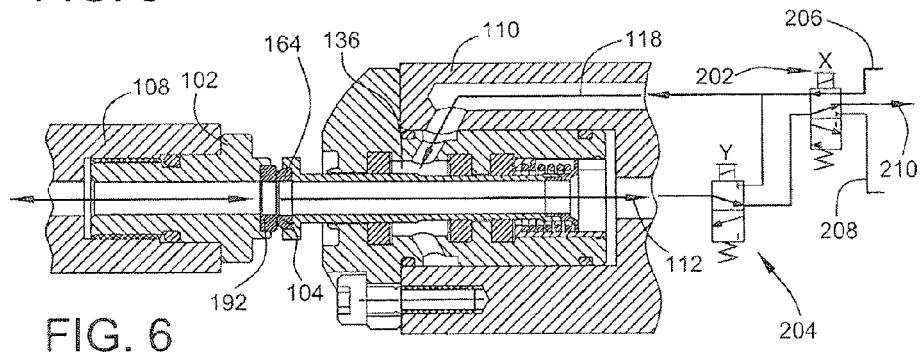
FIG. 6 is a cross section during operation under a venting condition in accordance with the disclosure.

As shown in FIG. 6, the second fluid valve 204 is placed at the second position and the first fluid valve 202 is placed at the second position. At these valve positions, the media channel 112 is fluidly connected to the vented reservoir 210, and the control chamber 136 is placed in fluid connection with the first fluid reservoir 206, which as discussed in the operating state shown in FIG. 5 contains the pressurized incompressible medium. In this operating state, venting of the media channel 112 operates to depressurize any medium found therein while the sealable engagement between the rotating and non-rotating seal rings 192 and 164 is maintained. In this operating condition, media found within the media channel 112 is free to vent toward the vented reservoir 210 and, potentially, also vent out from the working port (not shown) of the rotating machine component 108, which in the illustration of FIG. 6 would generally be disposed somewhere off the left end of the rotating machine component 108, as is known.

In certain applications, venting of media through the open or working end of the portion of the media channel 112 defined in the rotating machine component 108 may be undesirable. A variation of the operating condition shown in FIG. 6 is presented in FIG. 7, where the vented reservoir 210 is replaced by a vacuum sink 710. The vacuum sink 710 may be a sealed tank or other reservoir that is capable of maintaining a vacuum. The term vacuum, as used herein, means any pressure that is lower than atmospheric pressure. As shown in FIG. 7, the vacuum sink 710 draws and evacuates fluid from the media channel 112 without allowing fluid to vent from either the working port (not shown) on the rotating machine component 108 or the engaged interface between the rings 164 and 192.

In summary, the rotary union 100 can operate under any one of the five different operating states depending on the type of medium used and the type of medium evacuation desired, although other operating arrangements are contemplated. For example, a rotary union having a spring disposed to impart a closing rather than an opening force may be used.

Moreover, even through the control chamber is illustrated as being connected to a source of fluid pressure, in alternate operating states the control chamber may be connected to fluid sinks having lower than atmospheric pressure.

In one general aspect of the present disclosure, the sealing engagement between the rotating and non-rotating seal rings 192 and 164 can be selectively controlled under conditions that would otherwise have caused retraction or extension of the non-rotating seal member 104. For example, when comparing the operating state shown in FIG. 3 with the operating state shown in FIG. 6 or FIG. 7, a depressurization of the media channel 112 will cause retraction of the non-rotating seal member 104 due to the opening force of the spring 176 unless the control chamber 136 is pressurized, as shown in FIG. 6. In the operating state shown in FIG. 6, pressurization of the control chamber 136 imparts a closing force on the non-rotating seal member 104 that can overcome the opening force of the spring 176 and maintain engagement between the rotating and non-rotating seal rings 192 and 164.

An alternative embodiment of a rotary union 800 is shown in FIGS. 8 and 9. The rotary union 800 is structurally similar to the rotary union 100 shown in FIGS. 1-7 in many aspects, but does not include the opening spring 176 (FIG. 1B) in cavity 802. Other components of the rotary union 800 that are the same or similar to corresponding components previously described relative to the rotary union 100 are denoted by the same reference numerals in FIGS. 8 and 9 as previously used.

As shown in FIGS. 8 and 9, the rotary union 800 is capable of achieving sealable engagement between the rotating and non-rotating seal rings 192 and 164 over a broad range of axial displacement, X, between the rotating and non-rotating seal rings 192 and 164 along the centerline 130. The ability of rotary unions 100 and 800 to achieve sealable engagement between the rotating and non-rotating seal rings 192 and 164 over the distance X is made possible by the sliding sealable association between the non-rotating seal member 104 and the non-rotating machine component 110 provided by the sliding seals 146, 152, and 156.

An alternate embodiment of a rotary union 900 is shown in FIG. 10. The rotary union 900 is structurally and functionally similar to the rotary union 100, but has a more compact structural arrangement. Similar to the discussion relative to the rotary union 800 shown in FIGS. 8 and 9, structural elements of the rotary union 900 that are the same or similar to corresponding elements of the rotary unions 100 and 800 previously described are denoted in FIG. 10 with the same reference numerals as previously used, even though the size or scale of such components may differ.

As shown in FIG. 10, the non-rotating seal member 104 has the non-rotating seal ring 164 disposed at an end thereof adjacent the rotating seal ring 192 of the rotating seal member 102. The rotary union 900 includes a non-rotating machine component 110 forming a control channel 918 in fluid communication with the control chamber 136 defined between the non-rotating seal member 104 and a housing 906, in a similar fashion as described relative to the rotary union 100 (FIG. 1B). The housing 906 is threadably engaged with the non-rotating machine component 910 via a threaded portion 902 that is formed externally to a cylindrical body portion 916 of the housing 906. The threaded portion 902 mates with threads defined along an internal portion of a receiving counterbore 914 to retain the housing 906 within the non-rotating machine component 910. Similar to the rotary union 100, the rotary union 900 includes two radial seals 942, which in the illustrated embodiment are O-ring seals, disposed in sealing relationship on either side of the control chamber 136 to fluidly isolate it from the receiving counterbore 914 and from atmosphere.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A rotary union, comprising:
   a housing having a bore in fluid communication with a media channel opening and a control chamber disposed around the bore and being fluidly isolated from the media channel opening;
   a non-rotating seal member slidably disposed within the bore in the housing and having a media channel that is fluidly open to the media channel opening through the bore;
   a first sliding seal disposed around the non-rotating seal member and disposed to seal the control chamber from the atmosphere;
   two additional sliding seals disposed around the non-rotating seal member adjacent one another, the two additional seals disposed between the control chamber and the media channel opening as a pair to seal the control chamber from the media channel;
   wherein the non-rotating seal member is arranged and configured to extend relative to the housing when a fluid under pressure is present in the control chamber such that the non-rotating seal member engages a rotating seal member and forms a mechanical face seal therewith while the rotating seal member is rotating.

2. The rotary union of claim 1, wherein the non-rotating seal member has a first balance ratio arranged to urge the non-rotating seal member to extend from the housing when the fluid under pressure is present at the media channel opening.

3. The rotary union in claim 1, wherein the non-rotating seal member has a second balance ratio arranged to urge the non-rotating seal member to extend from the housing when the fluid pressure is present at the control chamber and at least one of an ambient pressure or a vacuum is present at the media channel.

4. The rotary union of claim 1, further comprising a control chamber inlet and a control chamber annulus fluidly interconnecting the control chamber inlet and the control channel when the housing is connected to a non-rotating machine component.

5. The rotary union of claim 1, further comprising an opening spring disposed to provide an opening force urging the non-rotating seal member to retract into the housing.

6. The rotary union of claim 1, further comprising a non-rotating machine component forming a receiving counterbore into which the housing is disposed.

7. The rotary union of claim 1, further comprising a first fluid valve arrangement operable to selectively fluidly connect the control chamber with at least one of a source of pressurized incompressible media, a vacuum sink, and a vent.

8. The rotary union of claim 7, further comprising a second fluid valve operable to selectively fluidly connect the media channel with at least one of a source of pressurized compressible media, the source of pressurized incompressible media, the control chamber, the vacuum sink, and the vent.

9. The rotary union of claim 1, further comprising a rotating seal member disposed on a rotating machine component such that the rotating seal member engages the non-rotating seal member when the non-rotating seal member is sufficiently extended from the housing.

10. The rotary union of claim 9, further comprising a non-rotating seal ring disposed at an end of the non-rotating seal member, and a rotating seal ring disposed on the rotating seal member in facing relationship with the non-rotating seal ring, such that engagement of the rotating seal ring with the non-rotating seal ring provides a mechanical face seal along a media channel, the media channel being in fluid communication with the media channel opening and extending through portions of the rotating machine component and the housing.

11. A system for selectively fluidly interconnecting a media channel defined through portions of rotating and non-rotating machine components, comprising:
   a receiving counterbore defined in the non-rotating machine component, a media channel opening in fluid communication with the receiving counterbore, and a control channel;
   a housing disposed within the receiving counterbore and having a bore in fluid communication with the receiving counterbore and a control chamber in fluid communication with the control channel;
   a non-rotating seal member slidably and sealingly disposed within the bore in the housing and having a media channel that is fluidly open to the media channel opening through the receiving counterbore;
   a first sliding seal disposed around the non-rotating seal member and disposed to seal the control chamber from the atmosphere;
   two additional sliding seals disposed around the non-rotating seal member between the control chamber and adjacent one another, the two additional seals disposed as a pair to seal the control chamber from the media channel; and
   a first fluid valve arrangement operable to selectively fluidly connect the control chamber with at least one of a source of pressurized incompressible media, a vacuum sink, and a vent, such that the non-rotating seal member is arranged and configured to extend relative to the housing when a fluid under pressure is present in the control chamber such that the non-rotating seal member engages a rotating seal member and forms a mechanical face seal therewith while the rotating seal member is rotating.

12. The system of claim 11, further comprising a second fluid valve operable to selectively fluidly connect the media channel with at least one of a source of pressurized compressible media, the source of pressurized incompressible media, the control chamber, the vacuum sink, and the vent.

13. The system of claim 11, further comprising an opening spring disposed to provide an opening force urging the non-rotating seal member in a retracting direction relative to the housing.

14. The system of claim 11, further comprising a rotating seal member disposed on the rotating machine component such that the rotating seal member engages the non-rotating seal member when the non-rotating seal member is sufficiently extended relative to the housing.

15. The system of claim 14, further comprising a non-rotating seal ring disposed at an end of the non-rotating seal member, and a rotating seal ring disposed on the rotating seal member in facing relationship with the non-rotating seal ring, such that engagement of the rotating seal ring with the non-rotating seal ring provides a mechanical face seal along the media channel.

16. A method for operating a rotary union adapted to provide a mechanical face seal along a media channel extending between a rotating machine component and a non-rotating machine component, the method comprising selectively engaging the mechanical face seal by applying a fluid pressure to a control chamber that is fluidly isolated from the media channel and that is defined between a non-rotating seal member and the non-rotating machine component;
   wherein the non-rotating seal member is slidably disposed within a bore in the housing and includes a portion of the media channel, said media channel being fluidly open with a media channel opening through the bore; and
   wherein the fluid pressure applied urges the non-rotating seal member to extend relative to the housing such that the non-rotating seal member engages a rotating seal member and form the mechanical face seal therewith while the rotating seal member is rotating.

17. The method of claim 16, further comprising maintaining the mechanical face seal in an engaged position during fluid evacuation from the media channel.

18. The method of claim 16, further comprising providing a first net hydraulic force on the non-rotating seal member as a result of fluid pressure in the control chamber acting on a first balance ratio structurally defined on the non-rotating seal member.

19. The method of claim 18, further comprising providing a second net hydraulic force on the non-rotating seal member as a result of fluid pressure in the media channel acting on a second balance ratio structurally defined on the non-rotating seal member.

* * * * *